United States Patent
Musy et al.

(10) Patent No.: US 9,555,747 B2
(45) Date of Patent: Jan. 31, 2017

(54) INTERNAL TRIM PART, COMPRISING A DECORATIVE SKIN HAVING A DECORATIVE ELEMENT THAT IS ARRANGED IN A DEPRESSION IN THE DECORATIVE SKIN AND IS CONNECTED TO THE DECORATIVE SKIN BY MEANS OF ULTRASONIC WELDING, AND METHOD FOR PRODUCING SAID INTERNAL TRIM PART WITH DECORATIVE ELEMENT

(71) Applicant: Faurecia Innenraum Systeme GmbH, Hagenbach (DE)

(72) Inventors: Maxime Musy, Karlsruhe (DE); Andreas Meyer, Hatzenbühl (DE); Martin Schulz, Karlsruhe (DE)

(73) Assignee: Faurecia Innenraum Systeme GmbH, Hagenbach (DE)

(*) Notice: Subject to any disclaimer, the term of this patent is extended or adjusted under 35 U.S.C. 154(b) by 97 days.

(21) Appl. No.: 14/390,349

(22) PCT Filed: Apr. 2, 2013

(86) PCT No.: PCT/EP2013/056937
§ 371 (c)(1),
(2) Date: Oct. 2, 2014

(87) PCT Pub. No.: WO2013/150026
PCT Pub. Date: Oct. 10, 2013

(65) Prior Publication Data
US 2015/0048639 A1 Feb. 19, 2015

(30) Foreign Application Priority Data
Apr. 2, 2012 (DE) .......................... 10 2012 205 382

(51) Int. Cl.
*B29C 65/08* (2006.01)
*B60R 13/02* (2006.01)
(Continued)

(52) U.S. Cl.
CPC ............. *B60R 13/02* (2013.01); *B29C 44/141* (2013.01); *B29C 65/08* (2013.01); *B29C 66/526* (2013.01);
(Continued)

(58) Field of Classification Search
CPC . B60R 13/02; B60N 2/5883; B29C 66/73152; B29C 66/84; B29C 66/727; B29C 66/5268; B29C 66/69; B29C 66/526; B29C 66/532; B29C 66/7392
(Continued)

(56) References Cited

U.S. PATENT DOCUMENTS 6,991,841 B2 *  1/2006  Cowelchuk ......... B29C 44/1257
                                                296/146.7
7,104,590 B2 *  9/2006  Dooley .................. B60N 2/466
                                                296/1.09
(Continued)

FOREIGN PATENT DOCUMENTS

DE   10 2005 034257 A1   1/2007
DE   10 2005 051456 B3   4/2007
(Continued)

OTHER PUBLICATIONS

International Search Report for PCT/EP2013/056937 dated May 23, 2013, 3 pages (translated).
(Continued)

*Primary Examiner* — Pinel Romain
(74) *Attorney, Agent, or Firm* — Reising Ethington P.C.

(57) ABSTRACT

The present invention relates to an internal trim part for a vehicle, comprising at least two layers. A decorative skin (1)
(Continued)

forms an upper layer and has a depression (3), in which a decorative element (8) is arranged. The decorative element (8) is connected to the decorative skin (1) by means of a bonded connection, such as a weld seam, in particular an ultrasonic weld seam (16). The invention further relates to a method for producing an internal trim part and to a device for performing said method.

20 Claims, 9 Drawing Sheets

(51) Int. Cl.
B29C 44/14 (2006.01)
B29C 65/00 (2006.01)
B29L 31/30 (2006.01)
B29K 101/12 (2006.01)
B29L 9/00 (2006.01)

(52) U.S. Cl.
CPC ......... *B29C 66/5268* (2013.01); *B29C 66/532* (2013.01); *B29C 66/69* (2013.01); *B29C 66/727* (2013.01); *B29C 66/7392* (2013.01); *B29C 66/73152* (2013.01); *B29C 66/84* (2013.01); *B29C 66/71* (2013.01); *B29C 66/73921* (2013.01); *B29K 2101/12* (2013.01); *B29K 2995/007* (2013.01); *B29L 2009/00* (2013.01); *B29L 2031/3005* (2013.01); *B60R 2013/0281* (2013.01); *B60R 2013/0287* (2013.01); *B60R 2013/0293* (2013.01); *Y10T 156/17* (2015.01)

(58) Field of Classification Search
USPC .............................................. 296/146.7, 1.08
See application file for complete search history.

(56) References Cited

U.S. PATENT DOCUMENTS

| 2008/0107889 | A1* | 5/2008 | Fox | ....................... | B29C 44/086 |
| | | | | | 428/319.7 |
| 2008/0299373 | A1 | 12/2008 | Gonzalez | | |
| 2010/0181794 | A1 | 7/2010 | Heinz et al. | | |
| 2011/0097537 | A1 | 4/2011 | Koetter et al. | | |
| 2012/0313391 | A1* | 12/2012 | Kornylo | ............... | B60N 2/5883 |
| | | | | | 296/1.08 |

FOREIGN PATENT DOCUMENTS

| DE | 10 2006 056535 A1 | 5/2008 |
| DE | 10 2008 012431 A1 | 9/2009 |
| FR | 2 907 755 A1 | 5/2008 |

OTHER PUBLICATIONS

Written Opinion for PCT/EP2013/056937 dated May 23, 2013, 9 pages (translated).

* cited by examiner

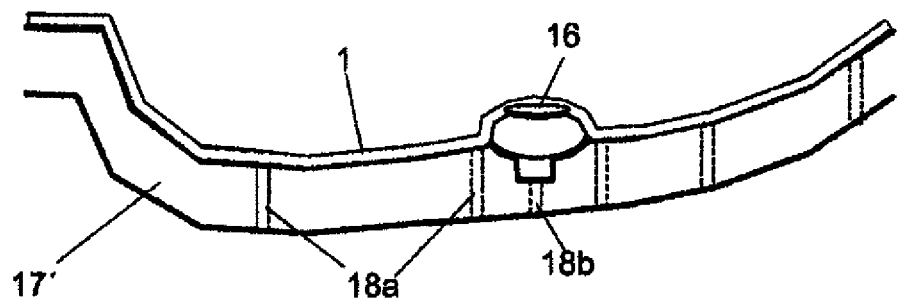
d)
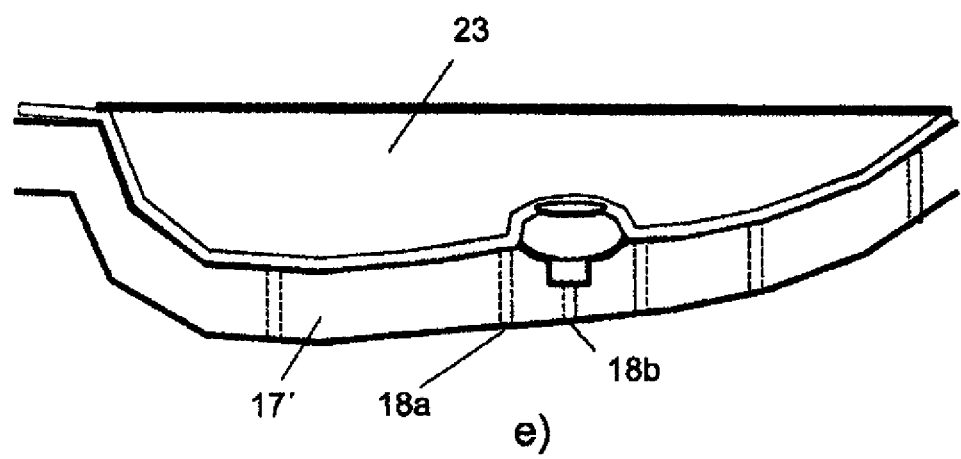
e)
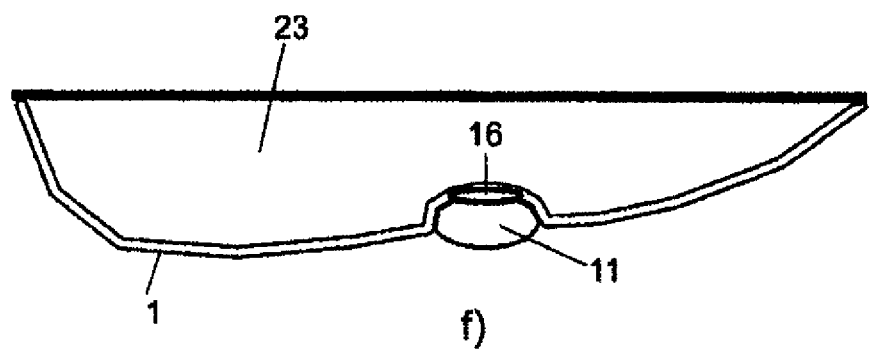
f)
Fig. 8

INTERNAL TRIM PART, COMPRISING A DECORATIVE SKIN HAVING A DECORATIVE ELEMENT THAT IS ARRANGED IN A DEPRESSION IN THE DECORATIVE SKIN AND IS CONNECTED TO THE DECORATIVE SKIN BY MEANS OF ULTRASONIC WELDING, AND METHOD FOR PRODUCING SAID INTERNAL TRIM PART WITH DECORATIVE ELEMENT

TECHNICAL FIELD

The present invention relates to an inner trim part with a decor skin comprising a recess, in which a decor arrangement is arranged, said decor element being connected to the decor skin by way of ultrasonic welding. The invention moreover relates to a method for fastening the decor element in the recess of the decor skin.

BACKGROUND

Inner trim parts for vehicles consist generally of several pieces which are connected to one another. The connection locations after installation of one of these inner trim parts should be as inconspicuous as possible seen from a vehicle interior; thus should be covered or hidden in another manner, in order to ensure pleasing aesthetics of such inner trim parts. Usually, such a connection location is arranged in a recess to a side of the finished decor skin which is away from the viewer. Such a teaching is to be deduced for example from the document DE 10 2005 034 257 A1. The disadvantage with this is the fact that the narrowing of the recess includes additional process steps which increase the complexity and thus also the costs of the manufacturing method.

SUMMARY

It is therefore the object of the present invention, to suggest an inner trim part, with which a decor skin can be aesthetically improved in an as simple as possible, but simultaneously reliable and stable manner. It is also an object of the invention to suggest a method for manufacturing such an inner trim part.

According to the invention, this object is achieved by an inner trim part according to claim 1 and by a method according to claim 12. Moreover, a device for carrying out the method is described in claim 15. Advantageous further developments are described in the dependent claims.

An inner trim part according to the invention, for a vehicle, comprises at least two layers, of which an upper layer is a decor skin. The decor skin comprises a recess, into which a decor element is incorporated. The decor element is connected to the decor skin via a material-fit connection, i.e. a connection, with which the connection partners are held together by way of atomic or molecular forces. The decor element for example can be connected to the decor skin by way of a bonding connection or a weld connection (in particular a weld seam which can extend for example along the decor element). The weld connection for example can be designed as an ultrasonic weld seam.

It is possible by way of the provision of the recess in the decor skin, to fashion a side of the decor skin which faces a vehicle occupant after installation, in a varied and aesthetically pleasing manner. A recess hereby should be understood as all formations, with which a height difference between two surfaces of the decor skin is present, thus for example a groove or step is incorporated into the decor skin.

The decor skin is enhanced by way of covering the incorporated recesses with the decor element, wherein for example a pure pressing of the decor element into the recess often does not have the desired stability, whereas a bonding connection between the decor element and the decor skin by way of adhesive exiting at a viewed side can negatively influence the qualitative appearance of the decor skin. In contrast, a connection of the decor element to the decor skin by way of ultrasonic welding permits a mechanically stable connection of both elements as well as a qualitatively high appearance on a side of the decor skin which faces a vehicle interior after the installation. Ultrasonic welding hereby is suitable to reliably connect different materials to the decor skin. Apart from an increased strength of the connection compared to a purely bonding connection, a long term stability of a colour of the decor skin is also realised by way of the ultrasonic welding, since no chemical reactions between the adhesive and the decor skin are to be feared. Simultaneously, haptics characteristics of the inner trim part can be set in a wide range by way of a two-layered construction. In particular, with soft decor skins, the decor element despite this can be well fixed on the decor skin by way of the ultrasonic welding.

Typically, an intermediate layer or a carrier is provided as a lower layer, thus below the decor skin. The intermediate layer hereby can include a foam layer, a textile layer and/or an adhesive layer. In a particularly preferred manner, the inner trim part is constructed of three layers, wherein the intermediate layer is arranged between the decor skin and the carrier and ensures a reliable connection between the carrier and the decor skin at economical costs. The lower layer merely serves for setting the haptics characteristics of the inner trim part.

The decor skin and/or the decor element can have a hardness degree of greater than Shore-A and smaller than 95 Shore-A, preferably greater than 60 Shore-A and smaller than 75 Shore-A, particularly preferably larger than 64 Shore-A and smaller than 70 Shore-A. The hardness degree is preferably at least 50 Shore-A and at the most is 95 Shore-A, so that the decor skin and/or the decor element is not too soft and not too stiff. Moreover, the decor skin and/or the decor element can have a modulus of elasticity of greater than 1 MPa, preferably greater than 2 MPa, in particular preferably greater than 3 MPa and smaller than 7 MPa at a temperature of 293 K, thus room temperature, and a pulling speed rate of 100 mm/min. The modulus of elasticity hereby is determined according to DIN EN ISO 527-3 as a test standard. The decor skin and/or the decor element are thus preferably designed in a flexible manner, thus are extensible and bendable in a wide range. However, one can also envisage not designing the decor skin and/or the decor element in a flexible manner, but in a stiff manner. The hardness degree of the decor skin and/or of the decor element is particularly preferably greater than the hardness degree of the lower layer.

Preferably, the ultrasonic weld seam only runs on a base of the recess of the decor skin. A base of the recess of the decor skin in this document, independently of a shape of the recess, is to be understood as the region of the recess which is distanced furthest from the viewed side facing the vehicle interior after installation. By way of this, on the one hand a reliable connection between the decor element and the decor skin is ensured, and on the other hand one does not have to weld an unnecessary amount of material of the decor skin to the decor element. The decor skin and/or the decor element can be of a thermoplastic material such as polyvinyl chloride (PVC), thermoplastic polyurethane (TPU), thermoplastic olefin (TPO) or a thermoplastic elastomer or at least comprise a thermoplastic material. Thermoplastic materials are easy to handle and manufacture as well as simple to apply for ultrasonic welding.

A decor skin for an inner trim part of a vehicle is manufactured in one embodiment by way of a slush process, is therefore a slush skin and comprises a recess. A deep-drawn decor skin can also be used instead of a slush skin. A slush process in this document is to be understood as all manufacturing methods, with which a starting material is brought into a mould, the mould close and heated, and the starting material distributed uniformly on the walls of the slush mould by way of rotation of the mould. Thus with the cooling of the mould, a slush skin forms by way of continued rotation of the mould, and this slush skin can be easily removed from the mould after the opening. Rotation sintering in particular is to be understood as a slush process. The use of a slush skin as a decor skin has the advantage of using an embodiment of the decor skin which is common for inner trim parts, with characteristics or properties which can be set in wide regions, such as for example with a different hardness degree, and this simultaneously permits the decor element to be reliably kept at an envisaged position in the recess by way of the ultrasonic weld seam. Slush skins as a rule do not have a uniform thickness, which is inherent of the manufacture, and this renders a connection to further elements more difficult. Preferably therefore, the ultrasonic weld seam can run on the recess only in sections, thus an ultrasonic welding can be effected only at certain sections.

In an advantageous further development, the decor element is a strip, a tape, a round cord or a ledge. The decor element thus preferably has dimensions, with which a length of the decor element is greater than a width or a diameter of the decor element. In particular, the decor element can have a length which is more than fivefold, tenfold, twentyfold or fiftyfold the width. A cross section of the decor element hereby can assume different shapes, for example a round, elliptical, rectangular or square shape. The cross section of the decor element however can also have an asymmetrical shape. The width and a depth of the decor element in each case preferably are between 1 mm and 15 mm. The wider the recess, the better is the ultrasonic welding able to be effected.

The decor element can preferably also be formed from a continuous material. In particular, the decor element can be formed completely of a cavity-free material, i.e. one can envisage the decor element having no foamed material. The decor element for example can comprise a plastic.

The recess seen in cross section can likewise have different shapes, for example be semicircular, rectangular or tapering in a pointed manner. Moreover, the recess in cross section can also be designed in a non-symmetrical manner, for example in a stepped manner with at least one step. Differently shaped decor elements can firstly be reliably received in the recess by way of this, before a final connection is effected between the decor skin and the decor element by way of the ultrasonic welding.

The recess preferably extends over a length of between 5 mm and 1.5 m, particularly preferably between 10 mm and 1 m. This ensures that longer lines to be covered are also reliably covered by the decor element. In a particularly preferred manner, the recess in a longitudinal section is elongate, preferably linear. This permits connection locations which as a rule are likewise elongate, to be reliably covered. A course of the recess however can also be linear only at least in regions or arcuate.

One can envisage a connection location of two parts of the decor skin lying in the recess and being covered by the decor element. An aesthetically pleasing transition between the two parts forming the decor skin is produced by way of this, without the connection location still being visible on the viewed side. The two parts of the decor skin which are connected to one another via the connection location, preferably each have at least one different characteristic. Such different characteristics or properties can be different colours, embossing, thicknesses, pitting, moduli of elasticity, degrees of hardness, haptics characteristics or likewise. Thus a decor skin can be provided with the most different of characteristics, without the appearance and the aesthetic look-and-feel being negatively influenced by connection locations.

A method for manufacturing an inner trim part for a vehicle and comprising at least two layers comprises several steps. In a first step, a decor element is brought into a recess of a decor skin, wherein the decor skin forms an upper layer of the later inner trim part. In a further step, the decor element which until now was not yet connected to the decor skin is fastened in the recess of the decor skin by way of ultrasonic welding. Finally, a lower layer which serves as an upper layer of the inner trim part is fastened on the decor skin at a side which is away from the decor element, thus a side which is away from the viewed side. A secure connection between the decor skin and the decor element can be achieved by way of this, and an inner trim part with several layers, via which layers the haptics characteristics can be set and with a surface which is upgraded by the decor element is manufactured.

One advantageous further development envisages only a base of the recess of the decor skin being connected to the decor element. Thus an ultrasonic input can be effected accordingly briefly and with a minimum of energy, thus with a minimum of costs, since no walls of the decor skin are welded. Simultaneously, a connection only at the base of the groove permits a certain correction of the position of the decor element within the recess.

Moreover, one can envisage the ultrasonic welding being effected from the rear side of the decor skin. Hereby, the rear side of the decor skin is to be understood as the side of the decor skin which is away from the viewed side facing the vehicle interior after the installation. No traces of machining or processing are to be seen whatsoever on the viewed side due to this, since the recess is away from the viewed side. Moreover, the ultrasonic welding is significantly simplified by way of this, since the welding apparatus can be led directly to the location of the desired energy input.

The ultrasonic welding is typically effected with an ultrasonic frequency of between 20 kHz and 70 kHz, particularly preferably between 25 kHz and 40 kHz, and with an ultrasonic power of between 400 W and 4 kW, preferably 1 kW, in order to set a reliable connection between the decor element and the decor skin. In a particularly preferred manner, a section of the decor element which is between 10 mm and 20 mm, preferably 15 mm wide is subjected to radiation with ultrasonic over a typical time period of maximal 1 s per cm of recess.

Particularly preferably, by way of the described method, the decor skin with the previously described characteristics is manufactured, for manufacturing the described decor skin. Characteristics which have only be disclosed with regard to the method, or characteristics which have only been described with regard to the decor skin, accordingly should also be seen as being disclosed in the context of the decor skin or the method.

A device for carrying out the described method comprises a mould which is provided with suction channels and which is with a surface. The decor skin can be fixed on the surface by way of sucking (suctioning) during the implementation of the method. Moreover, the surface comprises a hollow, in which the decor element can be attached during the suctioning. The decor element is held at a defined position of the decor skin during the method by way of the hollow of the mould and the decor skin fixed by the suctioning. Thus flexible and soft decor skins which are difficult to handle by way of ultrasonic welding due to a non-uniform thickness can also be reliably processed. A regular structure is otherwise very difficult to be formed in such decor skins, but this can also be effected with decor skins of a low hardness by way of the suctioning, which is preferably vacuum suctioning. Preferably, the recess is placed over the hollow, so that the decor element lies in the recess.

The hollow can have a shape which corresponds to the negative of the mould of the part of the decor element which projects beyond the decor skin with the finished trim part. The hollow for example can then have a semicircular cross section. The decor element then on suctioning lies on the base of the hollow almost over the complete surface, wherein the decor element does not lie only where a base of the hollow is interrupted on account of an opening of a suction channel.

In an alternative variant, the hollow has a shape which corresponds to the negative of the mould of the part of the decor element which projects beyond the decor skin with the finished trim part, only in an outer region. In contrast, in the middle region, the hollow is designed such that a cavity remains between the decor element and the base of the hollow given a decor element received in the hollow. This cavity which forms a vacuum space whilst a vacuum exists in the suction channels, is delimited on its side facing the decor skin by way of the decor element, and ensures that the vacuum acts over a relatively large region of the surface of the decor element uniformly on the decor element, and thus fixes this in a particularly reliable manner.

In particular, the cavity can be formed as a groove, which extends in a direction which corresponds to a longitudinal direction of the decor element, given a decor element arranged in the hollow. The groove for example can comprise a rectangular section. A vacuum channel can run out in the base of the groove.

BRIEF DESCRIPTION OF THE DRAWINGS

Embodiment examples of the invention are represented in the drawings and are explained hereinafter by way of FIGS. 1 to 8.

There are shown in.

DETAILED DESCRIPTION OF THE ILLUSTRATED EMBODIMENTS

Figure 1:
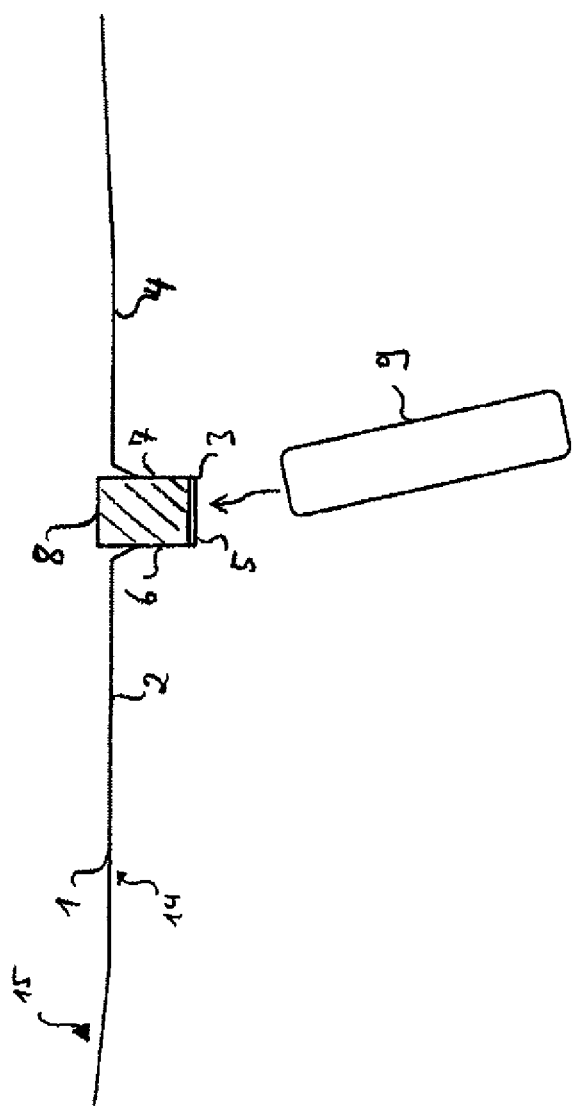
FIG. 1 a cross section of a decor skin and a recess, in which a decor element is arranged before welding by way of an ultrasonic sonotrode, FIG. 2 a view of the decor skin which corresponds to FIG. 1, after the ultrasonic welding, FIG. 3 the decor skin represented in FIG. 2, with a decor element fastened in the recess, said recess being a constituent of an inner trim part, FIG. 4 a view corresponding to FIG. 1, of a further embodiment example of a decor skin with a changed geometry of the recess and with a decor element which is circular in cross section, FIG. 5 a view of an embodiment example of the decor skin, with which the recess is asymmetrical, said view corresponding to FIG. 1, FIG. 6 a view of an embodiment example which is according to FIG. 1, with which the decor element is fastened on a step as a recess, FIG. 7 the decor skin which is represented in FIG. 4 and which is arranged in a mould for ultrasonic welding and FIG. 8a to f a further embodiment of a mould for ultrasonic welding the decor skin which is represented in FIG. 4, with the decor element likewise represented in FIG. 4, at different points in time of the method for fastening the decor element on the decor skin.

A decor skin 1 is shown in a sectioned representation in FIG. 1. The decor skin is a slush skin of polyvinyl chloride (PVC) as a thermoplastic material. The decor skin 1 is manufactured by way of a slush method, with which the powder-like plastic is brought into a slush mould, and the decor skin 1 is moulded amid the effect of heat and rotation of the slush mould. The decor skin 1 is flexible as well as extensible and pliable in a large range. A hardness degree of the decor skin 1 is 68 Shore A, and a modulus of elasticity 4 MPa. In further embodiment examples the decor skin 1 however can be formed in a stiffer manner, thus can have a hardness degree of greater than 68 Shore-A.

The decor skin 1 consists of a first part 2 which in FIG. 1 is arranged on the left of a recess 3, as well as of a second part 4 which is arranged right of the recess 3 in FIG. 1. Alternatively, the decor skin 1 can also be designed in a single-part manner. The recess 3 was already incorporated during the manufacture of the decor skin 1 and has a linear course over a length of 20 cm as well as a base 5 which forms a lowest point of the recess 3. The recess 3 thus comprises the base 5 as well as a left side wall 6 and a right side wall 7, which are arranged at right angles to the base 5, wherein the left side wall 6 is connected to the first part 2 of the decor skin 1 and the right side wall 7 is connected to the second part 4 of the decor skin 1. A distance between the left side wall 6 and the right side wall 67 and thus a width of the base 5 is 2 mm, and the base 5 is distanced 3 mm from a viewed side 15 of the decor skin 1 which faces the vehicle occupants after the installation, and this distance corresponds to a depth of the recess 3. The recess 3 is thus groove-like. The first part 2 and the second part 4 in each case have different colours and pitting, but are otherwise identical.

A decor strip 8 as a decor element of PVC as a thermoplastic material is incorporated in the recess 3, but however does not yet lie on the base 5. The decor strip 8 has a rectangular cross section and dimensions which permit the decor strip 8 to be integrated into the recess 3 in a flush manner. The decor strip 8 as soon as it lies on the base 5 terminates in a flush manner with the upper side of the decor skin 1. A length of the decor strip 8 is 20 cm and is greater than the dimensions of the decor strip 8 in cross section, thus greater than the width of the base 5 and a depth of the recess 3.

An ultrasonic sonotrode 9 which emits ultrasonic waves with a frequency of 35 kHz and a power of 1 kW is led onto the recess 3 from a side of the decor skin 1 which is away from the decor strip 8 (also called rear side 14), over a time period of 1 second. The ultrasonic sonotrode 9 at its tip is 15 mm wide and merely effects a local ultrasonic input onto individual locations of the decor skin 1. The decor strip 8 is welded to the base 5 by way of the ultrasonic effect onto the base 5 of the recess 3, since the thermoplastic material heats up and becomes softer by way of this and finally the decor strip 8 melts with the base 5. Alternatively or additionally, the decor strip 8 can also be welded to the left side wall 6 and/or to the right side wall 7.

Figure 2:
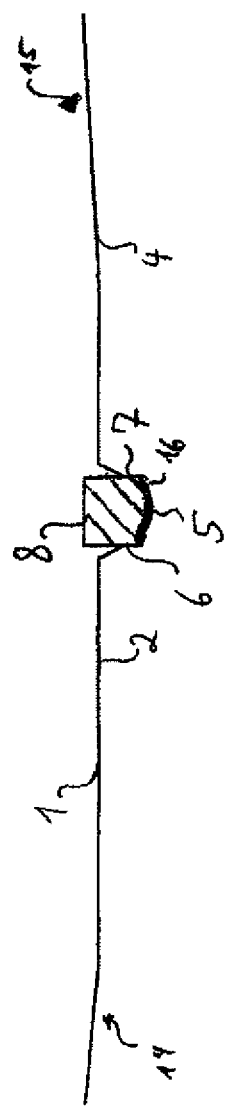

FIG. 2 in a sectioned view corresponding to FIG. 1 shows the decor skin 1 after the ultrasonic welding has been effected. Recurring features in this figure as well as in the following figures are provided with identical reference numerals. The base 5 of the recess 3 is now fixedly connected to the decor strip 8. The base 5 as well as the decor strip 8 have changed their shape on account of the ultrasonic welding, so that the base 5 which at the same time forms a lower side of the decor strip 8 is round and comprises an ultrasonic weld seam 16. The ultrasonic weld seam 16 connects the base 5 of the recess 3, and thus the decor skin 1 to the decor strip 8. The left side wall 6 and the right side wall 7 have no ultrasonic weld seam 16.

Figure 3:
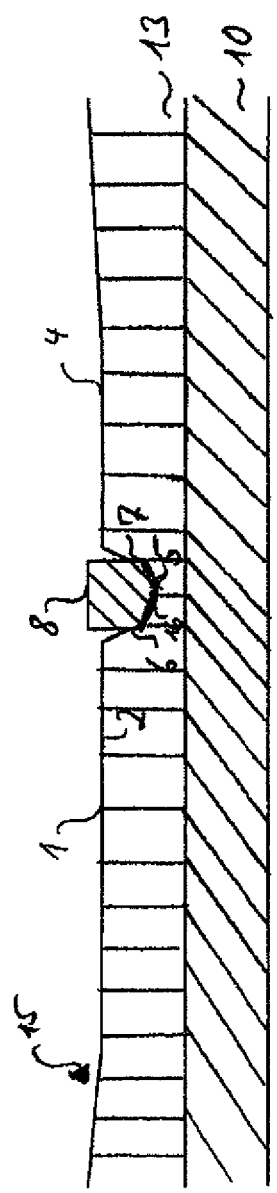

An inner trim part which comprises the decor skin 1 shown in FIG. 2 as an uppermost layer on the viewed side 15 is represented in FIG. 3 in a view corresponding to FIGS. 1 and 2. The inner trim part is an instrument panel for a motor vehicle, but in further embodiments the inner trim part can also be an arm rest or another component used in an interior. An intermediate layer 13 which is connected to the decor skin 1 is arranged below the decor skin 1 and is designed as a haptics layer, i.e. a layer which is compressible and gives the inner trim part flexible haptics. The intermediate layer 13 comprises a foam layer of polyurethane foam. In further embodiments, the intermediate layer 13 however can also include a textile ply which for example can be designed as a spacer fabric. Alternatively, the intermediate layer 13 can also be an adhesive layer. No sealing tapes against the exit of foam onto the viewed side 15 are necessary due to the fact that the decor skin 1 has no holes or openings, but a closed surface, also in the region of the ultrasonic weld seam 16.

The intermediate layer 13 is arranged between the decor skin 1 and a carrier 10 such that no part of the carrier 10 contacts the decor skin. The carrier 10 is of polypropylene and has a hardness degree which is greater than the hardness degree of the decor skin 1 and also greater than a hardness degree of the intermediate layer 13. A modulus of elasticity of the carrier 10 is likewise greater than the modulus of elasticity of the decor skin 1. The intermediate layer 13 can be connected to the decor skin 1 and the carrier 10 via an additional adhesive layer.

Figure 4:
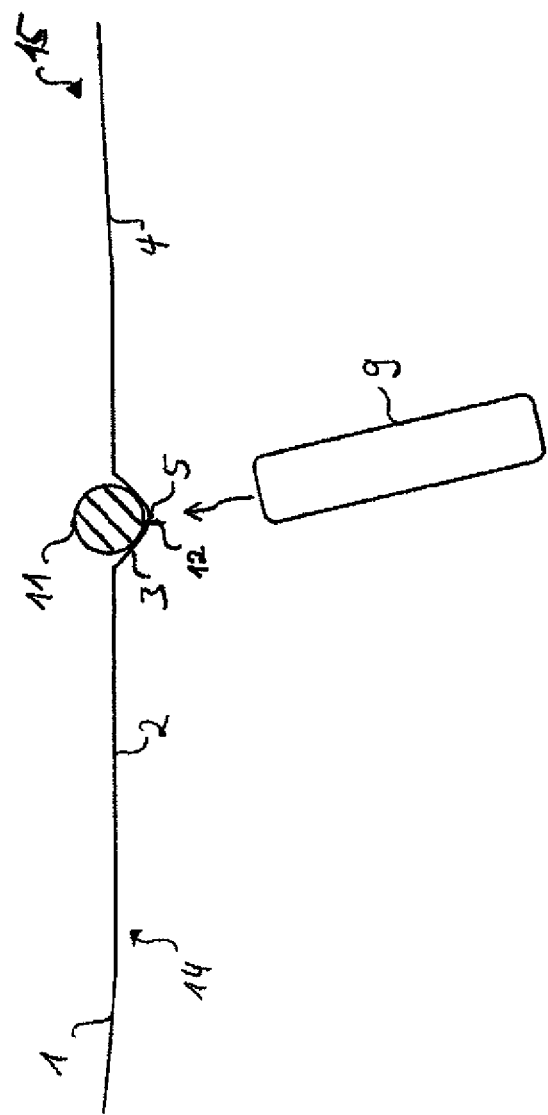

FIG. 4 in a sectioned view corresponding to FIG. 1 shows a further embodiment of the decor skin 1. The decor skin 1 in turn consists of the first part 2 and the second part 4, and these are connected to one another via a connection seam 12 as a connection location. The first part 2 and the second part 4 have been coloured differently during the manufacture. The recess 3 was likewise already incorporated into the decor skin 2 during manufacture. The recess 3 however is not rectangularly shaped as in the embodiment example represented in FIG. 1, but is arched, preferably in a semi-circular manner. The recess 3 runs arcuately over a length of 15 m. The base 5 of the recess 3 is therefore a point of the arched recess 3 which has a maximal distance to the viewed side 15 of the decor skin 1. The connection seam 12 lies centrally in the recess 3 on the base 5. This connection seam 12 can be an ultrasonic weld seam. The connection of the first part 2 and of the second part 4 by the connection seam 12 can however also be effected by yarn or an adhesive.

A decor strip 11 of PVC as a thermoplastic material is incorporated into the recess 3 and has a circular cross section and consists of a thermoplastic material. The cross section of the decor strip 11 can alternatively also have an elliptical surface or an asymmetrical surface. A diameter of the decor strip 11 is 8 mm and projects beyond the recess 3 and in further embodiments the diameter can however also be selected such that no part of the decor strip 11 projects beyond the recess 3. A length of the decor strip 11 corresponds to the length of the recess 3. The ultrasonic sonotrode 9 is led onto the recess 3 from the rear side 14 of the decor skin 1 which is away from the viewed side 15, and by way of ultrasonic input welds the decor strip 11 to the base 5 of the decor skin 1. The connection seam 12 is thus covered by the decor strip 11, is hidden beneath this and is not visible from the viewed side 15.

Figure 5:

FIG. 5 in a view corresponding to FIG. 1 shows a further embodiment example of the decor skin 1, with which the recess 3 is asymmetric. The decor skin 1 shown in FIG. 5 corresponds to the decor skin 1 shown in FIG. 4, but the left side wall 6 is longer than the right side wall 7. The recess 3 has an asymmetrical cross section on account of this. The ultrasonic weld seam 16 which connects the decor skin 1 to the decor strip 11 is arranged on the base 5 of the recess 3.

Figure 6:
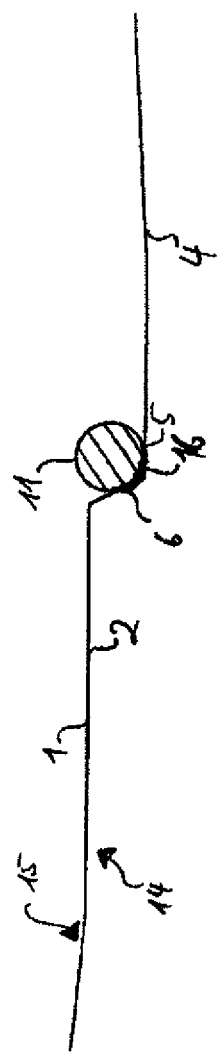

In the embodiment likewise represented in cross section in FIG. 6, the recess 3 is a step of the decor skin 1. The first part 2 hereby has a height difference to the second part 4. Both parts 2, 4 are connected to one another via a step. The decor strip 11 is connected by way of the ultrasonic weld seam 16 to the base 5 as well as to the left side wall 6. The base 5 merges into the second part 4 without an angling. The second part 4 is angled by 90° with respect to the left side wall 6, said left side wall in turn forming a right angle with the first part 2.

Figure 7:
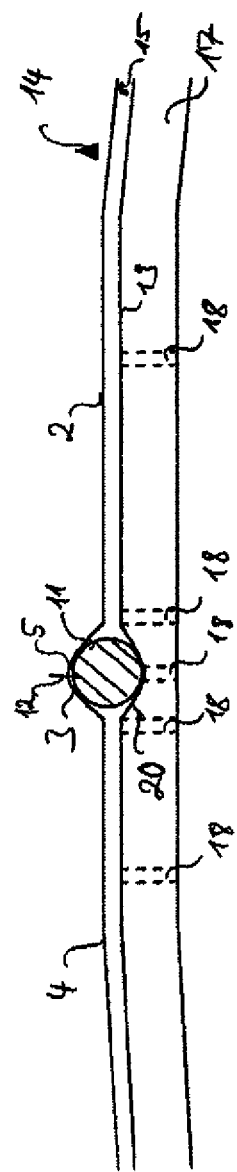

The decor skin 1 which is shown in FIG. 4 is arranged on a mould 17 having suction channels 18, in FIG. 7. The mould 17 for this has a surface 19, on which the decor skin 1 lies with the viewed side 15. The decor skin 1 is sucked onto the mould 17 and is positioned in a spatially fixed manner by way of the suction channels 18 which are uniformly distributed over the mould 17. The mould 17 moreover comprises a hollow 20, into which the decor strip 11 is inserted. One of the suction channels 18 which position the decor strip 11 in a spatially fixed manner is likewise located in this hollow 20. The recess 3 is located above the hollow 20. The decor strip 11 is thus enclosed by the hollow 20 and the recess 3. An ultrasonic welding can be effected from the rear side 14 due to the stationary fixed positioning of the decor skin 1 and the decor strip 11. Finally, a lower layer such as the intermediate layer 13 and/or the carrier 10 is fastened on the decor skin 1 for manufacturing the inner trim part.

Features of the different embodiments which are merely disclosed in the embodiment examples can be combined with one another and claimed individually.

One embodiment of the method for manufacturing a vehicle interior trim part is explained by way of FIGS. 8*a* to *f.*

Figure 8:
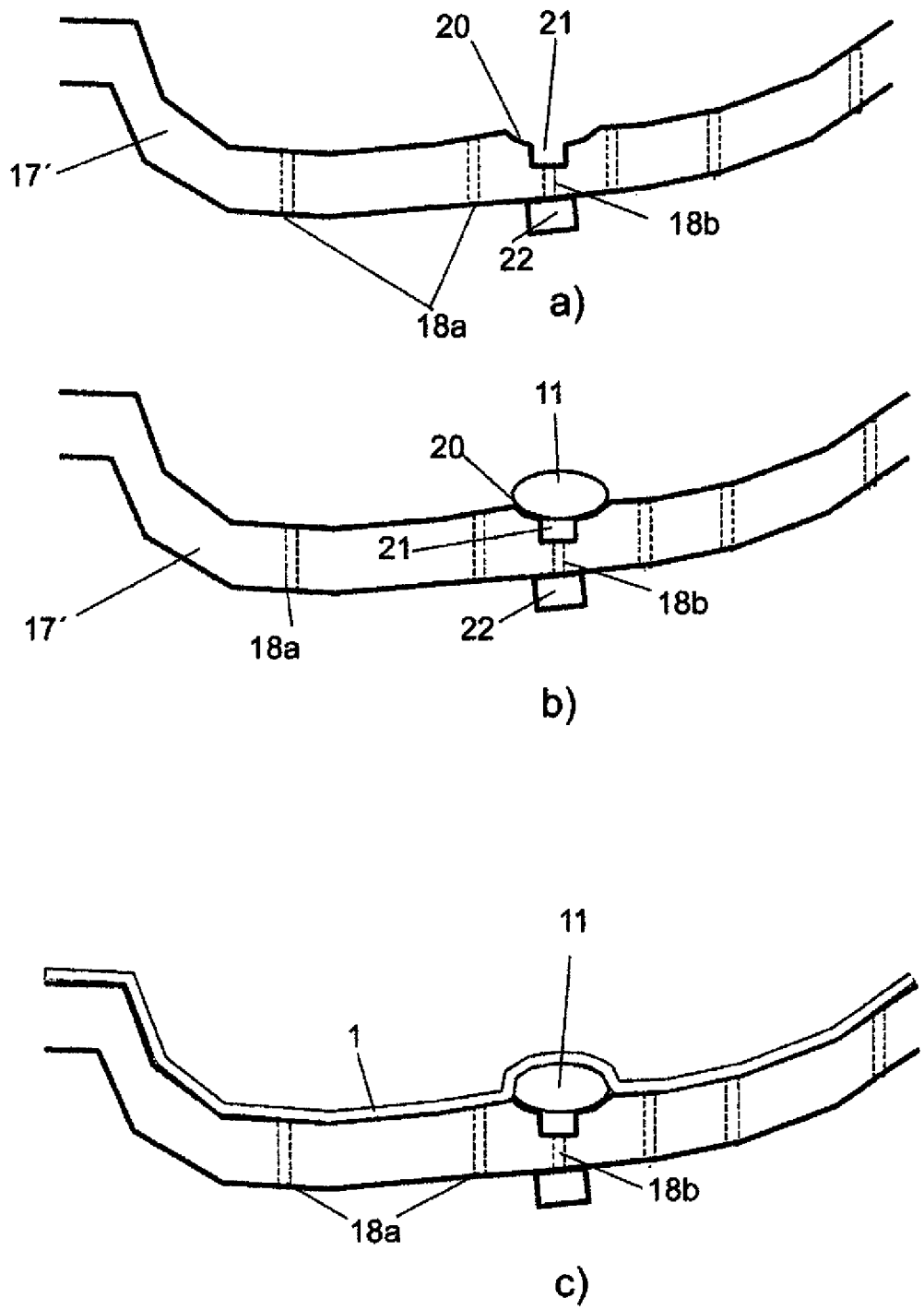

A mould 17' is represented in FIG. 8*a*, and this differs from the mould 17 of FIG. 7 in that a groove 21 is provided in a base of the hollow 20. The suction channels 18*a* which run out outside the groove 21 can be subjected to a vacuum independently of suction channels 18*b* which run out within the groove 21. For this, the suction channels 18*b* comprise a connection 22 for a vacuum supply, said connection being designed in a manner separate from connections for the vacuum supply of the suction channels 18*a*.

FIG. 8*b* shows the method at a later a point in time. In the meanwhile, the decor strip 11 was arranged in the hollow 20 and fixed by way of a vacuum applied via the suction channels 18*b* (one can also envisage only a single suction channel 18*b*). A vacuum is not yet present at the suction channels 18*a* at this point in time. The groove 21 between the decor strip 11 and the mould 17' forms a vacuum space which is closed by the decor strip 11.

Subsequently, the decors skin 1 is arranged on the mould 17', so that the decor skin 1 covers the decor strip 11. The decor skin 1 is now suctioned onto the mould 17' via the suction channels 18*a* by way of a vacuum 17'. The mould in its condition after this method step is pictured in FIG. 8*c*.

A weld seam is subsequently incorporated. This can be effected for example by way of ultrasonic welding. The trim part which is arranged on the mould 17' is shown in FIG. 8*d* after the incorporation of the weld seam 16. A bonding connection could also be provided instead of a weld seam 17. A decor strip which is provided with an adhesive already before laying onto the mould 17' could be used for this.

In a further method step, the decor skin 1 is back-foamed with a foam layer 23. The mould with the trim part after producing the foam layer 23 is shown in FIG. 8*a*.

The finished trim part represented in FIG. 8*f* is now removed from the mould 17'.

The invention claimed is:

1. An inner trim part for a vehicle, comprising at least two layers, wherein one of the layers is a decor skin, and further comprising a decor element arranged in a recess of the decor skin and being connected to the decor skin via a material-fit connection, wherein the material-fit connection comprises an ultrasonic weld seam.

2. An inner trim part according to claim 1, wherein the decor element is formed from a continuous, cavity-free material.

3. An inner trim part according to claim 1, wherein a layer arranged below the decor skin is an intermediate layer which comprises a foam layer, a textile layer and/or an adhesive layer, or is a carrier.

4. An inner trim part according to claim 1, wherein the decor skin and/or the decor element has a hardness degree of greater than 50 Shore-A and smaller that 95 Shore-A.

5. An inner trim part according to claim 1, wherein the decor skin and/or the decor element has a modulus of elasticity of greater than 1 MPa.

6. An inner trim part according to claim 1, wherein the decor skin and/or the decor element are of a thermoplastic material or comprise a thermoplastic material.

7. An inner trim part according to claim 1, wherein the decor skin is a slush skin.

8. An inner trim part according to claim 1, wherein the ultrasonic weld seam only runs on a base of the recess of the decor skin.

9. An inner trim part according to claim 1, wherein the decor element is a strip, a tape or a ledge.

10. An inner trim part according to claim 1, wherein a connection location of two parts of the decor skin lies in the recess and is covered by the decor element, wherein the two parts of the decor skin each have a different characteristic.

11. An inner trim part according to claim 1, wherein the recess in a longitudinal section is elongate and/or is step-like in cross section.

12. A method for manufacturing an inner trim part for a vehicle, said inner trim part comprising two layers, comprising the steps:
   a) incorporating a decor element into a recess of a decor skin, wherein the decor skin forms one of the two layers;
   b) fastening the decor element in the recess of the decor skin by way of a material-fit connection using ultrasonic welding; and
   c) fastening a lower one of the two layers on a side of the decor skin which is away from the decor element.

13. A method according to claim 12, wherein only a base of the recess of the decor skin is connected to the decor element.

14. A method according to claim 12, wherein the ultrasonic welding is effected from a rear side of the decor skin.

15. A device for carrying out the method according to claim 12, wherein the device comprises a mold which is provided with suction channels and a surface, wherein the decor skin is fixable on the surface by way of suctioning, and the surface comprises a hollow, in which the decor element can be attached during the suctioning.

16. A device according to claim 15, wherein a groove, in which at least one of the suction channels runs out, is incorporated in a base of the hollow.

17. A method according to claim 12, wherein, before the production of the material-fit connection, the decor element and the decor skin are arranged on a mold which is provided with suction channels and a surface, wherein the decor skin is fixable on the surface by way of suctioning, and the surface comprises a hollow, in which the decor element can be attached during the suctioning, and wherein the decor element and decor skin are fixed by way of producing a vacuum in the suction channels.

18. A method according to claim 17, wherein a groove, in which at least one of the suction channels runs out, is incorporated in a base of the hollow, and wherein the groove forms a vacuum space while a vacuum exists in the suction channels, said vacuum space being delimited by the decor element at a side of the vacuum space facing the decor skin.

19. A device for carrying out a method for manufacturing an inner trim part for a vehicle, said inner trim part comprising two layers, the method comprising the steps of:
   a) incorporating a decor element into a recess of a decor skin, wherein the decor skin forms one of the two layers;
   b) fastening the decor element in the recess of the decor skin by way of a material-fit connection; and
   c) fastening a lower one of the two layers on a side of the decor skin which is away from the decor element,
      wherein the device comprises a mold which is provided with suction channels and a surface, wherein the decor skin is fixable on the surface by way of suctioning, and the surface comprises a hollow, in which the decor element can be attached during the suctioning.

20. A device according to claim 19, wherein a groove, in which at least one of the suction channels runs out, is incorporated in a base of the hollow.

* * * * *